United States Patent

[11] 3,619,017

[72] Inventors John F. Robinson
 Newport Beach;
 Lynn A. Shackelford, Villa Park, both of Calif.
[21] Appl. No. 27,004
[22] Filed Apr. 9, 1970
[23] Division of Ser. No. 756,757,
 Sept. 3, 1968, Pat. No. 3,549,220
[45] Patented Nov. 9, 1971
[73] Assignee North American Rockwell Corporation

[54] LOW-STRESS BALL BEARINGS
 9 Claims, 2 Drawing Figs.
[52] U.S. Cl. ............................................. 308/184
[51] Int. Cl. ............................................. F16c 27/04
[50] Field of Search .................................. 308/184, 196, 189

[56] References Cited
 UNITED STATES PATENTS
 1,387,993 8/1921 Leon .............................. 308/184
 1,423,950 7/1922 Leon .............................. 308/184
 1,505,352 8/1924 Knowles ........................ 308/196
 3,404,925 10/1968 Bailey ............................ 308/184

Primary Examiner—Martin P. Schwadron
Assistant Examiner—Frank Susko
Attorneys—John R. Bronaugh, George R. Powers and Floyd S. Levison ABSTRACT: The invention relates to ball bearings in which the Hertzian stresses in the raceways are reduced by a construction in which one or both race members are so supported as to permit deflection in the manner of a beam in distinction to conventional bearings wherein the race members are supported over their entire circumferential area and compressed in effect as a solid block. By suitably proportioning the effective length and depth of the beam structure, in relation to the strength of the race material and to the applied load, a marked reduction in localized stresses and a consequent marked increase in operating life is achieved, without attendant disadvantages such as excessive decrease in stiffness, increase in friction, etc.

INVENTORS
John F. Robinson &
Lynn A. Shackelford

LOW-STRESS BALL BEARINGS

This is a divisional application of our pending application Ser. No. 756,757, filed Sept. 3, 1968, now U.S. Pat. No. 3,549,220, granted Dec. 22, 1970.

BACKGROUND OF THE INVENTION

1. Field of Invention

This invention is in the filed of Low-Stress Ball Bearings, defined herein as ball bearings of a novel construction wherein the Hertzian stresses in the raceways are substantially reduced, with consequent marked increase in operating life.

2. Description of Prior Art

Ball bearings are used in a very wide range of applications. At one extreme are large bearings intended to sustain high speeds or loads, or both, as in vehicle wheels, heavy machinery, etc. Here the outstanding requirement is for long operating life. A moderate amount of compliance is tolerable, as is some noisiness (vibration) if, as is sometimes the case, noise is not correlated with rapid wear. Also it is generally unnecessary for these types of bearings to define a rotation axis with extreme accuracy. Minimization of friction is often not a requirement. In general, a bearing which meets other requirements will have low enough friction.

At the other extreme are small bearings for use in precision instruments, e.g., gyros, accelerometers and gyrostabilized platforms. Here the outstanding requirements are for low and constant (nonfluctuating) friction combined with stiffness (so the bearing will very accurately establish a predetermined axis), and low vibration or noisiness. (Mechanical noise is reflected in noise in the electrical signal outputs of the instruments.) Long operating life is also important. The unsatisfactory state of the instrument bearing is revealed by considering that in some current practice it is typical to overhaul flight-control gyros every 300 hours, mainly because of deterioration of the gyro spin bearings.

A typical ball bearing employs a set of balls free to move in rolling contact with annular raceways. The raceways are generally of circular curvature in the plane which includes the bearing rotation axis. The exterior surface of the outer race member is of simple cylindrical shape (except in the case of certain kinds of self-aligning bearings, wherein it is spherical) as is also the interior surface of the inner race member. These surfaces abut the housing and the shaft respectively, solidly over their entire surface.

In such typical bearing in a no-load condition, the contact area between ball and raceway is extremely small, approximating a point. In order to increase the contact area and to distribute the load more uniformly, a substantial axial preload is usually applied to the assembly. (In gyro practice, for example, the preload is of the same order as the load the bearing is intended to carry.) This introduces high stresses in the contact region. The exterior load which the bearing carries is added to the preload. In addition, because of inevitable imperfections in the construction of the balls and races, and variations in the diameters of the balls, very high unpredictable stress concentrations exist between the balls and the raceways. As seen from any given point in the bearing, all these stresses are fluctuating.

As a result of these fluctuating stresses and the strains (deformations) corresponding thereto, in the course of time the material of the race members adjacent ro the raceway surfaces exhibits fatigue. Material fractures and flakes off, causing rapid and often sudden bearing failure. Fatigue is a major cause of deterioration and failure in ball bearings.

The bearing industry has spent many decades of study and experimentation in an effort to increase the average life of ball bearings.

One approach has been to select metals of great toughness, i.e., resistance to spalling and cracking, coupled with high hardness (resistance to permanent deformation by indentation). Extreme resistance to elastic deformation, as in a diamond, is not desirable, as such resistance results in an excessively small contact area. The alloy steel 52100 has proved to be the most generally useful metal.

Another approach has been to provide relatively high conformity between ball and raceway, by making the difference between the ball radius and the raceway cross radius as small as possible. Conformity is defined as the ratio R/D, where R is the race curvature and D is the ball diameter. Thus, 50 percent conformity is a perfect fit, and 52 percent conformity means a difference of 4 percent in ball and race radii. Manufacturing problems set a practical limit to what can be done in improving conformity. A conformity of about 52 percent is a typical limit for precision bearing practice, through a value of 50.5 can be achieved under special conditions with extreme refinement.

Still another approach has been to exercise the most exacting control of the ball and race geometries and surface finishes, and to protect the surfaces by seals and shielding. Choice of lubricant also affects operating life.

As a result of these approaches the life of bearings has been substantially increased from what it was a few decades ago, but there still remains much to be desired. Also some of the approaches are very costly. A pair of precision spin bearings for a certain integrating accelerometer, for example, may cost as must as nine hundred dollars.

SUMMARY OF THE INVENTION

The present invention relates to a novel type of bearing wherein Hertzian stresses in the raceways, which are the principal cause of fatigue failure, are substantially reduced, with substantially no attendant disadvantages or limitations. The result is achieved by constructions in which one or both of the race members are supported only at the end portions, so as to be capable of deflecting in the manner of a beam, in distinction to conventional bearings wherein the race members are supported over their entire circumferential area and are compressed in effect as a solid column or block. By properly proportioning the effective length and depth of the beam structure, in relation to the strength of the race material and to the applied load, the desired combination of properties is obtained for any particular application. The invention is applicable to radial, angular-contact and thrust bearings. Also, it may be used to advantage on the one hand in large bearings intended to handle the heaviest loads, and on the other to small, precision instrument bearings, the specific requirements of which are rather different from those of the first-named class.

It must be emphasized that the amount of beam-type deflection required to substantially reduce Hertzian stresses is extremely small. For a given size, the bearing of the invention is almost as stiff as a conventional bearing, unless a high degree of compliance is deliberately provided for in the beamlike structure.

OBJECTS

It is, therefore, an object of the present invention to provide a method and means of reducing Hertzian stresses in a ball bearing assembly, without deleterious effect on other characteristics of the bearing.

It is a further object of the present invention to provide a method and means of reducing Hertzian stresses in a ball bearing assembly by providing for a small, predetermined local bending, under ball loading, of one or both of the race members.

It is a still further object of the present invention to provide a method and means for increasing the contact area between ball and raceway without increasing the conformity of the ball and raceway fabricated.

It is another object of the present invention to provide a method and means for establishing a more uniform contact and stressing between the several balls and the raceway, without need for refining the geometry of the balls and raceway.

It is still another object of the present invention to provide for distributing ball loads in a bearing so that an oversize ball does not carry a disproportionate fraction of the load.

Another object of the present invention is to provide a ball bearing construction with provision for circulation of heat-transfer fluid in direct contact with the race members.

Still another object is to provide a ball bearing construction which has a long operating life and other desirable characteristics at least equal to those of conventional bearings, but with less exacting requirements on geometry and finish and hence producible at lower cost.

Other objects, features and advantages of the invention will become apparent to those skilled in the art from a reading of the following detailed description and analysis of several embodiments taken in conjunction with the accompanying drawings, in which:

DESCRIPTION OF THE INVENTION

The invention has important applicability to angular contact-type bearings, a type widely used because they can be arranged to take thrust as well as radial loads. The most common type of angular contact bearing may be conceived of in principle as a bearing of radial type with "undersize" balls so that under axial loading the race members and the circular ball tracks are displaced axially.

Figure 1:
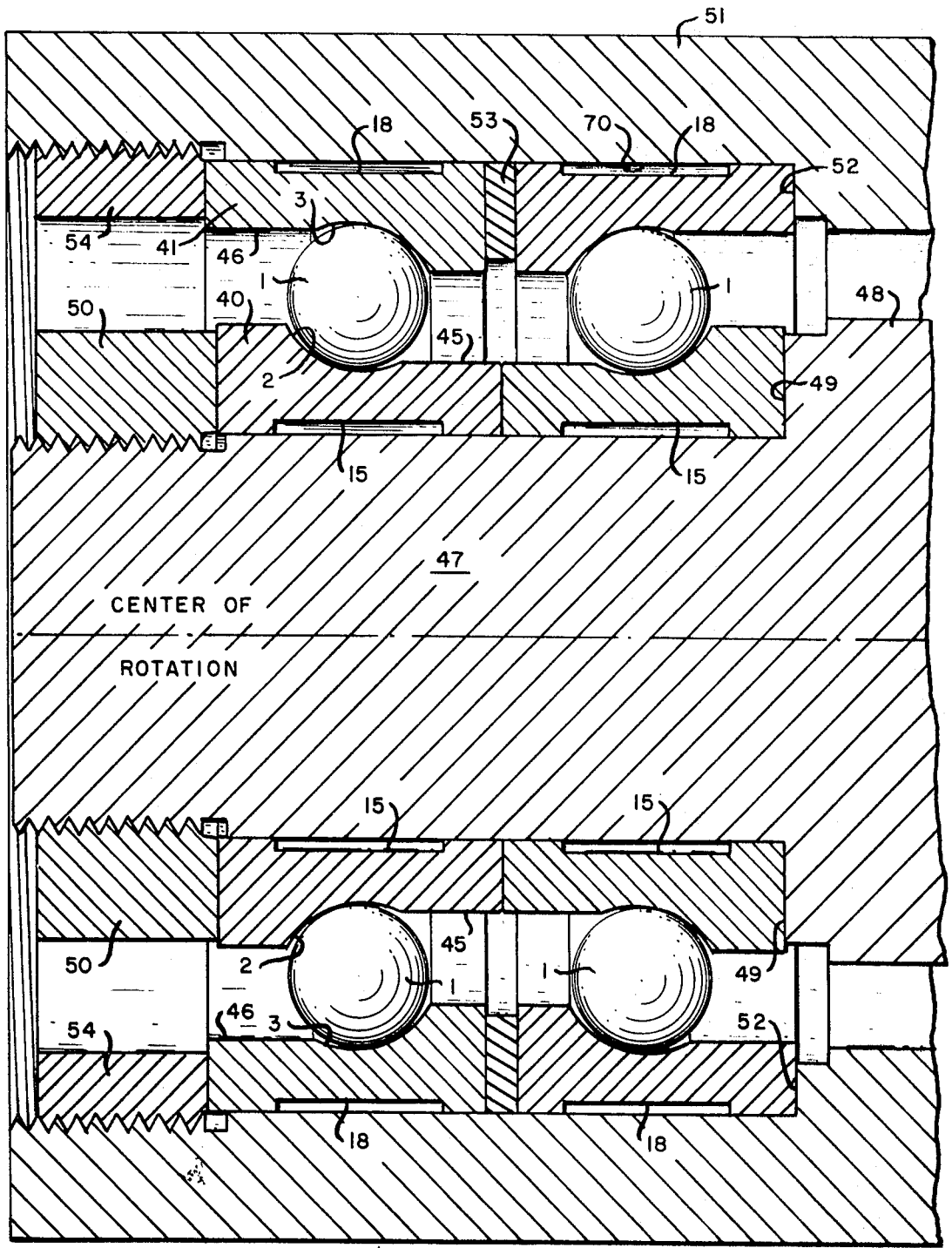
FIG. 1 is a view of an angular contact bearing (a matched pair being shown) made in accordance with the teachings of this invention.

Angular contact bearings are commonly used in pairs, preloaded against each other. Such an arrangement will be selected for illustration. Referring now to FIG. 1, tow identical bearings are shown in mirror-image relation. Each bearing comprises a set of balls 1, an inner race member 40 and an outer race member 41. The ball diameters are so selected relative to the radii of the inner and outer race members 40 and 41 that when the outer race member is shifted axially relative to the inner race member, by an amount from the central plane of symmetry the ball track circles on the races are shifted. The radius of the raceway curvature 2 of the inner race 40 and the radius of the raceway curvature 3 of the outer race 41 are set at points displaced from a central normal to the axis of rotation of the shaft 47, whereby the balls 1 move along annular paths. The superfluous portions of the raceways are cut away, leaving simple cylindrical portions 45 and 46.

The inner race members are mounted on a shaft portion 47 integral with a larger diameter shaft 48, defining an abutment 49. The race members are pressed against each other and the abutment by a threaded nut 50.

The outer race members are mounted in a bore 70 in a mount 51, having an abutment 52, and are pressed against each other and the abutment, via a spacer 53, by a threaded collar 54. The function of the spacer (whose thickness is exaggerated in the figure) is to establish the desired preload. By analysis and experiment by known methods the thickness of the spacer 53 can be made such that when nut 50 and collar 54 are tightened up snugly, the desired preload (force) will exist between the race members 46 and the balls, and hence a predetermined ball load along the load line.

By suitable selection, in known ways, of ball diameter in relation to raceway diameters and conformity of the raceways, a desired contact angle can be established for a given set of conditions.

The description of angular contact bearing practice up to this point has been conventional.

In accordance with the invention, the inner and outer race members are relieved at 15 and 18 respectively. The desired results namely the reduction of stresses at the points and/or areas contacted by the balls 1 as they are axially shifted under operational loading. Means are provided for applying preload as described, and the ball diameter is selected so that under the preload point of contact makes a predetermined contact angle with respect to the central reference plane.

As indicated above, this result is achieved by a bearing construction in which the inner or outer race members 40 or 41, or both, or the shaft support for the race members, provide an end support for the race members. This end support is such that the area of the space (e.g., 15 and 18) defined by the end supports is substantially less than the cross-sectional area of the intermediate region above the space or relief. By so constructing the bearing, the relieved race members 40 and 41 will be capable of deflecting in the manner of a beam thereby substantially reducing the Hertzian stresses in the bearing assembly. This is in distinction to conventional bearings wherein the race members are supported over their entire circumferential area and are compressed as a solid column or block and, therefore, they are highly stressed.

In many instrument bearing applications, the requirement exists for isoelasticity of the bearing itself or of the combination of the bearing and its support. Isoelasticity (see Slater et al., U.S. Pat. No. 2,647,808, issued Aug. 25, 1953, for a discussion) means that the bearing must exhibit equal deflection for a given load applied in any direction, or, in brief, that radial and thrust compliance must be equal. Otherwise gravity and other acceleration loads on the mass supported by the bearings may result in moments which can produce drift in the case of gyro spin bearings, or imposition of intolerably high moments on the gimbal servo system in the case of stable platforms. Conventional bearings of low contact angle are inherently quite anisoelastic, being substantially stiffer radially than axially. As proved in the Slater et al. patent the contact angle for an angular contact bearing of conventional configuration is 35.2 degrees.

The bearings of the present invention naturally tend in the direction of isoelasticity, because the race relief reduced their radial stiffness (slightly) while not substantially affecting the axial stiffness. By proper choice of beam dimensions in correlation with the elastic modulus of the race member material, isoelastic constructions can be achieved with a much lower contact angle than in conventional constructions, with a consequent improvement in running performance.

Figure 2:
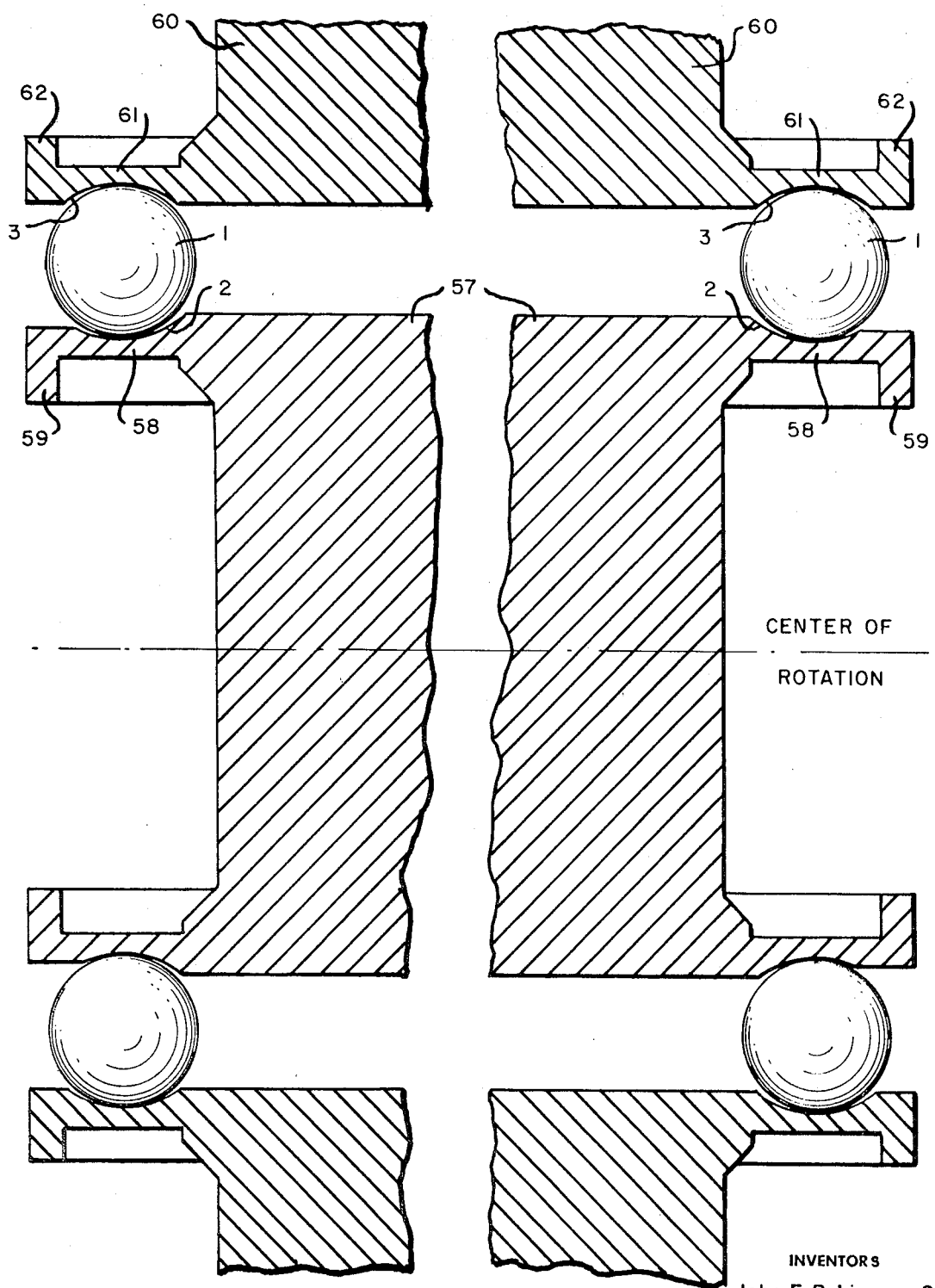
FIG. 2 is a cross-sectional view of an embodiment of the invention illustrating cantilever-supported inner and outer race members.

In the embodiments of the invention described above, the race members have been shown as supported at both ends, as in a conventional beam. However, some of the benefits of the invention are obtained if race-member support is at one end only, as in a cantilever beam. One such construction is shown in FIG. 2. Referring to FIG. 2, a shaft 57 is provided with a thin-walled, tubular extension 58 constituting a race member with an inner raceway 2 and a stiffening rim 59. A mount 60 is provided with a thin-walled, tubular member 61 constituting a race member with an outer raceway 3 and a stiffening rim 62. A similar set of ball bearing elements is provided at the opposite end of the shaft, as shown, and the shaft and mount are so constructed that the length between the center circles of inner raceways 2 is slightly greater than that between races 3, so that in the assembly bearing an axial preloading force exists tending to press the balls against the raceways. Under ball loading the portions of members 58 and 61 under each ball can deform locally, resulting in reduction of stresses in the manner already described.

It can be seen that in accordance with the present invention, the effective Hertzian stresses, which are a major limiting factor in the fatigue life of a bearing, are significantly decreased by permitting the ball bearing races to absorb energy by bending thereby distributing the load over a greater volume of the race material. Since the fatigue life of a bearing varies inversely as the maximum Hertzian stresses to approximately the ninth power, it can be appreciated that even a small decrease in the level of the stresses will drastically increase the life of the bearing.

While the invention has been described with respect to several physical embodiments constructed in accordance therewith, it will be apparent to those skilled in the art that various modifications and improvements may be made without departing from the spirit and scope of the invention. It is to be understood that the invention is not to be limited by the specific illustrative embodiments disclosed but only by the scope of the appended claims.

We claim: The embodiments of the invention in which an exclusive property of privilege is claimed are defined as follows:

1. A ball bearing comprising substantially coaxial relatively rotatable inner and outer annular races each formed of substantially incompressible material, said races having relatively thick annular sections adjacent their opposite ends and thinner intermediate annular regions providing apposed annular raceway surfaces on their adjacent faces, said raceway surfaces each being of uniform, arcuate cross section in planes radially of said race and coacting to define a toroidal space, a plurality of balls disposed in spaced relation throughout said toroidal space, at least one of said races being supported at one of its ends at said thick annular section, whereby said one race is free to deflect as a cantilever beam said relatively thick annular sections providing a circumferential radial stiffening support for at least one of said races only in axially spaced annular bands at the opposite sides of said toroidal space axially of said balls, said annular bands defining a circumferential annular space therebetween, the cross-sectional area of the thinner intermediate region being substantially than the area of said circumferential annular space, whereby said intermediate region of said one race is free to elastically deflect radially under load as an end-supported beam between said annular bands.

2. The bearing as defined in claim 1 wherein said race being supported at one of its ends at said thick annular section is said inner race.

3. The bearing as defined in claim 1 wherein said race being supported at one of its ends at said thick annular section is said outer race.

4. The bearing as defined in claim 1 wherein said one race having axially spaced annular bands is said inner race.

5. The bearing as defined in claim 1 wherein said one race having axially spaced annular bands is said outer race.

6. The bearing as defined in claim 1 wherein each of said inner and outer races are each supported at one end at their thick annular sections.

7. The bearing as defined in claim 1 wherein preloading means are further provided for effecting a predetermined load between said races and said balls.

8. The ball bearing as defined in claim 1 wherein said circumferential annular spaced is substantially rectangular in cross section.

9. The bearing as defined in claim 1 wherein said annular bands are integral with said races at said races' thick annular sections.

* * * * *

PO-1050
(5/69)

UNITED STATES PATENT OFFICE
CERTIFICATE OF CORRECTION

Patent No. 3,619,017                Dated    November 9, 1971

Inventor(s) JOHN F. ROBINSON AND LYNN A. SHACKELFORD

It is certified that error appears in the above-identified patent and that said Letters Patent are hereby corrected as shown below:

Column 2, line 10, change "through" to read "though"

line 67, after "raceway" insert "as"

line 73, after "provide" insert "a method"

Column 3, line 45, after "central" insert "plane"

Column 4, line 20, change "Pat. No. 2,647,808" to "Pat. No. 2,649,808"

line 56, change "assembly" to read "assembled"

Column 5, line 25, after "substantially" insert "less"

Column 6, line 21, change "spaced" to read "space"

Signed and sealed this 23rd day of January 1973.

SEAL)
ttest:

DWARD M. FLETCHER, JR.
ttesting Officer

ROBERT GOTTSCHALK
Commissioner of Patents